US009076490B1

(12) United States Patent
Nie et al.

(10) Patent No.: US 9,076,490 B1
(45) Date of Patent: Jul. 7, 2015

(54) DISK DRIVE WRITING RADIAL OFFSET SPIRAL SERVO TRACKS BY READING SPIRAL SEED TRACKS

(71) Applicant: Western Digital Technologies, Inc., Irvine, CA (US)

(72) Inventors: Jianbin Nie, San Jose, CA (US); Edgar D. Sheh, San Jose, CA (US); Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/712,905

(22) Filed: Dec. 12, 2012

(51) Int. Cl.
*G11B 21/02* (2006.01)
*G11B 21/08* (2006.01)
*G11B 5/596* (2006.01)
*G11B 5/55* (2006.01)

(52) U.S. Cl.
CPC ............ *G11B 21/08* (2013.01); *G11B 5/59661* (2013.01); *G11B 5/59638* (2013.01); *G11B 5/5543* (2013.01)

(58) Field of Classification Search
CPC ............. G11B 5/59661; G11B 5/5526; G11B 5/5543; G11B 5/5926; G11B 5/59633; G11B 5/59638; G11B 5/59644; G11B 11/10578; G11B 17/0402
USPC ................ 360/55, 69, 75, 77.05, 77.08, 77.11
See application file for complete search history.

(56) References Cited

U.S. PATENT DOCUMENTS

| 5,668,679 | A | 9/1997 | Swearingen et al. |
|---|---|---|---|
| 5,754,352 | A | 5/1998 | Behrens et al. |
| 6,005,727 | A | 12/1999 | Behrens et al. |
| 6,014,283 | A | 1/2000 | Codilian et al. |
| 6,021,012 | A | 2/2000 | Bang |
| 6,052,076 | A | 4/2000 | Patton, III et al. |
| 6,052,250 | A | 4/2000 | Golowka et al. |
| 6,067,206 | A | 5/2000 | Hull et al. |
| 6,078,453 | A | 6/2000 | Dziallo et al. |
| 6,091,564 | A | 7/2000 | Codilian et al. |
| 6,094,020 | A | 7/2000 | Goretzki et al. |
| 6,101,065 | A | 8/2000 | Alfred et al. |
| 6,104,153 | A | 8/2000 | Codilian et al. |
| 6,122,133 | A | 9/2000 | Nazarian et al. |
| 6,122,135 | A | 9/2000 | Stich |
| 6,141,175 | A | 10/2000 | Nazarian et al. |
| 6,160,368 | A | 12/2000 | Plutowski |
| 6,181,502 | B1 | 1/2001 | Hussein et al. |
| 6,191,906 | B1 | 2/2001 | Buch |
| 6,195,222 | B1 | 2/2001 | Heminger et al. |
| 6,198,584 | B1 | 3/2001 | Codilian et al. |
| 6,198,590 | B1 | 3/2001 | Codilian et al. |

(Continued)

OTHER PUBLICATIONS

Brian P. Rigney, et al., U.S. Appl. No. 13/205,072, filed Aug. 8, 2011, 41 pages.

*Primary Examiner* — Thomas Alunkal

(57) ABSTRACT

A disk drive is disclosed comprising a head actuated over a disk comprising a plurality of spiral seed tracks. The head is positioned at a first radial location over the disk, and the head is servoed over the disk in response to the spiral seed tracks starting from the first radial location in order to write a first spiral servo track on the disk. The head is positioned at a second radial location over the disk different from the first radial location, and the head is servoed over the disk in response to the spiral seed tracks starting from the second radial location in order to write a second spiral servo track on the disk.

14 Claims, 5 Drawing Sheets

(56) References Cited

U.S. PATENT DOCUMENTS

| | | |
|---|---|---|
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,318 B1 | 9/2001 | Hayashi |
| 6,292,320 B1 | 9/2001 | Mason et al. |
| 6,304,407 B1 | 10/2001 | Baker et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,411,453 B1 | 6/2002 | Chainer et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,519,107 B1 | 2/2003 | Ehrlich et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,587,293 B1 | 7/2003 | Ding et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,704,156 B1 | 3/2004 | Baker et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,205 B1 | 5/2004 | Moran et al. |
| 6,738,220 B1 | 5/2004 | Codilian |
| 6,747,837 B1 | 6/2004 | Bennett |
| 6,751,041 B1 * | 6/2004 | Codilian et al. ............ 360/73.03 |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,943,978 B1 | 9/2005 | Lee |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,799 B1 | 11/2005 | Lee |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,985,316 B1 | 1/2006 | Liikanen et al. |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 * | 1/2006 | Ying et al. ...................... 360/75 |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,002,761 B1 | 2/2006 | Sutardja et al. |
| 7,006,320 B1 | 2/2006 | Bennett et al. |
| 7,016,134 B1 | 3/2006 | Agarwal et al. |
| 7,019,937 B1 | 3/2006 | Liikanen et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,533 B1 | 8/2006 | Shepherd et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,136,253 B1 | 11/2006 | Liikanen et al. |
| 7,145,744 B1 | 12/2006 | Clawson et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,230,786 B1 | 6/2007 | Ray et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,256,956 B2 | 8/2007 | Ehrlich |
| 7,265,933 B1 | 9/2007 | Phan et al. |
| 7,289,288 B1 | 10/2007 | Tu |
| 7,298,574 B1 | 11/2007 | Melkote et al. |

(56) References Cited

U.S. PATENT DOCUMENTS

| | | | |
|---|---|---|---|
| 7,301,717 B1 | 11/2007 | Lee et al. | |
| 7,304,819 B1 | 12/2007 | Melkote et al. | |
| 7,330,019 B1 | 2/2008 | Bennett | |
| 7,330,327 B1 | 2/2008 | Chue et al. | |
| 7,333,280 B1 | 2/2008 | Lifchits et al. | |
| 7,333,286 B2 | 2/2008 | Jung et al. | |
| 7,333,290 B1 | 2/2008 | Kupferman | |
| 7,339,761 B1 | 3/2008 | Tu et al. | |
| 7,365,932 B1 | 4/2008 | Bennett | |
| 7,382,564 B1 | 6/2008 | Everett et al. | |
| 7,388,728 B1 | 6/2008 | Chen et al. | |
| 7,391,583 B1 | 6/2008 | Sheh et al. | |
| 7,391,584 B1 | 6/2008 | Sheh et al. | |
| 7,405,897 B2 | 7/2008 | Dougherty et al. | |
| 7,411,758 B1* | 8/2008 | Cheung et al. | 360/75 |
| 7,414,809 B2 | 8/2008 | Smith et al. | |
| 7,433,143 B1 | 10/2008 | Ying et al. | |
| 7,440,210 B1 | 10/2008 | Lee | |
| 7,440,225 B1 | 10/2008 | Chen et al. | |
| 7,450,334 B1 | 11/2008 | Wang et al. | |
| 7,450,336 B1 | 11/2008 | Wang et al. | |
| 7,453,661 B1* | 11/2008 | Jang et al. | 360/75 |
| 7,457,071 B1 | 11/2008 | Sheh | |
| 7,466,509 B1 | 12/2008 | Chen et al. | |
| 7,468,855 B1 | 12/2008 | Weerasooriya et al. | |
| 7,477,471 B1 | 1/2009 | Nemshick et al. | |
| 7,480,116 B1 | 1/2009 | Bennett | |
| 7,489,464 B1 | 2/2009 | McNab et al. | |
| 7,492,546 B1 | 2/2009 | Miyamura | |
| 7,495,857 B1 | 2/2009 | Bennett | |
| 7,499,236 B1 | 3/2009 | Lee et al. | |
| 7,502,192 B1 | 3/2009 | Wang et al. | |
| 7,502,195 B1 | 3/2009 | Wu et al. | |
| 7,502,197 B1 | 3/2009 | Chue | |
| 7,505,223 B1 | 3/2009 | McCornack | |
| 7,522,370 B1 | 4/2009 | Sutardja | |
| 7,529,055 B1 | 5/2009 | Laks et al. | |
| 7,542,225 B1 | 6/2009 | Ding et al. | |
| 7,548,392 B1 | 6/2009 | Desai et al. | |
| 7,551,387 B2 | 6/2009 | Sun et al. | |
| 7,551,390 B1 | 6/2009 | Wang et al. | |
| 7,558,016 B1 | 7/2009 | Le et al. | |
| 7,561,361 B1 | 7/2009 | Rutherford | |
| 7,573,670 B1 | 8/2009 | Ryan et al. | |
| 7,576,941 B1 | 8/2009 | Chen et al. | |
| 7,580,212 B1 | 8/2009 | Li et al. | |
| 7,583,470 B1 | 9/2009 | Chen et al. | |
| 7,595,954 B1 | 9/2009 | Chen et al. | |
| 7,602,575 B1 | 10/2009 | Lifchits et al. | |
| 7,616,399 B1 | 11/2009 | Chen et al. | |
| 7,619,844 B1 | 11/2009 | Bennett | |
| 7,619,846 B2 | 11/2009 | Shepherd et al. | |
| 7,623,313 B1 | 11/2009 | Liikanen et al. | |
| 7,626,782 B1 | 12/2009 | Yu et al. | |
| 7,630,162 B2 | 12/2009 | Zhao et al. | |
| 7,639,445 B2 | 12/2009 | Matsunaga et al. | |
| 7,639,446 B2 | 12/2009 | Mizukoshi et al. | |
| 7,639,447 B1 | 12/2009 | Yu et al. | |
| 7,656,604 B1 | 2/2010 | Liang et al. | |
| 7,656,607 B1 | 2/2010 | Bennett | |
| 7,660,067 B1 | 2/2010 | Ji et al. | |
| 7,663,835 B1 | 2/2010 | Yu et al. | |
| 7,675,705 B2 | 3/2010 | Mizukoshi et al. | |
| 7,675,707 B1 | 3/2010 | Liu et al. | |
| 7,679,854 B1 | 3/2010 | Narayana et al. | |
| 7,688,534 B1 | 3/2010 | McCornack | |
| 7,688,538 B1 | 3/2010 | Chen et al. | |
| 7,688,539 B1* | 3/2010 | Bryant et al. | 360/75 |
| 7,697,233 B1 | 4/2010 | Bennett et al. | |
| 7,701,661 B1 | 4/2010 | Bennett | |
| 7,710,676 B1 | 5/2010 | Chue | |
| 7,715,138 B1 | 5/2010 | Kupferman | |
| 7,715,143 B2 | 5/2010 | Bliss et al. | |
| 7,728,539 B2 | 6/2010 | Smith et al. | |
| 7,729,079 B1 | 6/2010 | Huber | |
| 7,733,189 B1 | 6/2010 | Bennett | |
| 7,733,588 B1 | 6/2010 | Ying | |
| 7,737,793 B1 | 6/2010 | Ying et al. | |
| 7,746,592 B1 | 6/2010 | Liang et al. | |
| 7,746,594 B1 | 6/2010 | Guo et al. | |
| 7,746,595 B1 | 6/2010 | Guo et al. | |
| 7,751,144 B1 | 7/2010 | Sutardja | |
| 7,760,461 B1 | 7/2010 | Bennett | |
| 7,787,211 B2 | 8/2010 | Kim et al. | |
| 7,800,853 B1 | 9/2010 | Guo et al. | |
| 7,800,856 B1 | 9/2010 | Bennett et al. | |
| 7,800,857 B1 | 9/2010 | Calaway et al. | |
| 7,839,591 B1 | 11/2010 | Weerasooriya et al. | |
| 7,839,595 B1 | 11/2010 | Chue et al. | |
| 7,839,600 B1 | 11/2010 | Babinski et al. | |
| 7,843,662 B1 | 11/2010 | Weerasooriya et al. | |
| 7,852,588 B1 | 12/2010 | Ferris et al. | |
| 7,852,592 B1* | 12/2010 | Liang et al. | 360/75 |
| 7,852,598 B1 | 12/2010 | Sutardja | |
| 7,864,481 B1 | 1/2011 | Kon et al. | |
| 7,864,482 B1 | 1/2011 | Babinski et al. | |
| 7,869,155 B1 | 1/2011 | Wong | |
| 7,876,522 B1 | 1/2011 | Calaway et al. | |
| 7,876,523 B1 | 1/2011 | Panyavoravaj et al. | |
| 7,881,004 B2 | 2/2011 | Kumbla et al. | |
| 7,881,005 B1 | 2/2011 | Cheung et al. | |
| 7,916,415 B1 | 3/2011 | Chue | |
| 7,916,416 B1 | 3/2011 | Guo et al. | |
| 7,916,420 B1 | 3/2011 | McFadyen et al. | |
| 7,916,422 B1 | 3/2011 | Guo et al. | |
| 7,929,238 B1 | 4/2011 | Vasquez | |
| 7,961,422 B1 | 6/2011 | Chen et al. | |
| 8,000,053 B1 | 8/2011 | Anderson | |
| 8,031,423 B1 | 10/2011 | Tsai et al. | |
| 8,054,022 B1 | 11/2011 | Ryan et al. | |
| 8,059,357 B1 | 11/2011 | Knigge et al. | |
| 8,059,360 B1 | 11/2011 | Melkote et al. | |
| 8,072,703 B1 | 12/2011 | Calaway et al. | |
| 8,077,428 B1 | 12/2011 | Chen et al. | |
| 8,078,901 B1 | 12/2011 | Meyer et al. | |
| 8,081,395 B1 | 12/2011 | Ferris | |
| 8,085,020 B1 | 12/2011 | Bennett | |
| 8,116,023 B1 | 2/2012 | Kupferman | |
| 8,145,934 B1 | 3/2012 | Ferris et al. | |
| 8,179,626 B1 | 5/2012 | Ryan et al. | |
| 8,184,392 B1* | 5/2012 | Cheung et al. | 360/51 |
| 8,189,286 B1 | 5/2012 | Chen et al. | |
| 8,213,106 B1 | 7/2012 | Guo et al. | |
| 8,254,222 B1 | 8/2012 | Tang | |
| 8,300,348 B1 | 10/2012 | Liu et al. | |
| 8,315,005 B1 | 11/2012 | Zou et al. | |
| 8,320,069 B1 | 11/2012 | Knigge et al. | |
| 8,351,174 B1 | 1/2013 | Gardner et al. | |
| 8,358,114 B1 | 1/2013 | Ferris et al. | |
| 8,358,145 B1 | 1/2013 | Ferris et al. | |
| 8,390,367 B1 | 3/2013 | Bennett | |
| 8,432,031 B1 | 4/2013 | Agness et al. | |
| 8,432,629 B1 | 4/2013 | Rigney et al. | |
| 8,451,697 B1 | 5/2013 | Rigney et al. | |
| 8,482,873 B1 | 7/2013 | Chue et al. | |
| 8,498,076 B1 | 7/2013 | Sheh et al. | |
| 8,498,172 B1 | 7/2013 | Patton, III et al. | |
| 8,508,881 B1 | 8/2013 | Babinski et al. | |
| 8,531,798 B1 | 9/2013 | Xi et al. | |
| 8,537,486 B2 | 9/2013 | Liang et al. | |
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,605,382 B1 | 12/2013 | Mallary et al. | |
| 8,605,384 B1 | 12/2013 | Liu et al. | |
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2 | 1/2014 | Bennett et al. | |
| 8,630,059 B1 | 1/2014 | Chen et al. | |
| 8,634,154 B1 | 1/2014 | Rigney et al. | |
| 8,634,283 B1* | 1/2014 | Rigney et al. | 369/44.28 |
| 8,643,976 B1 | 2/2014 | Wang et al. | |

(56) References Cited

U.S. PATENT DOCUMENTS

| | | | | |
|---|---|---|---|---|
| 8,649,121 | B1 | 2/2014 | Smith et al. | |
| 8,654,466 | B1 | 2/2014 | McFadyen | |
| 8,654,467 | B1 | 2/2014 | Wong et al. | |
| 8,665,546 | B1 | 3/2014 | Zhao et al. | |
| 8,665,551 | B1 | 3/2014 | Rigney et al. | |
| 8,670,206 | B1 | 3/2014 | Liang et al. | |
| 8,687,308 | B1 * | 4/2014 | Katchmart | 360/55 |
| 8,687,312 | B1 | 4/2014 | Liang | |
| 8,693,123 | B1 | 4/2014 | Guo et al. | |
| 8,693,134 | B1 | 4/2014 | Xi et al. | |
| 8,699,173 | B1 | 4/2014 | Kang et al. | |
| 8,711,027 | B1 | 4/2014 | Bennett | |
| 8,717,696 | B1 | 5/2014 | Ryan et al. | |
| 8,717,699 | B1 | 5/2014 | Ferris | |
| 8,717,704 | B1 | 5/2014 | Yu et al. | |
| 8,724,245 | B1 | 5/2014 | Smith et al. | |
| 8,724,253 | B1 | 5/2014 | Liang et al. | |
| 8,724,524 | B2 | 5/2014 | Urabe et al. | |
| 8,737,008 | B1 | 5/2014 | Watanabe et al. | |
| 8,737,013 | B2 | 5/2014 | Zhou et al. | |
| 8,743,495 | B1 | 6/2014 | Chen et al. | |
| 8,743,503 | B1 | 6/2014 | Tang et al. | |
| 8,743,504 | B1 | 6/2014 | Bryant et al. | |
| 8,749,904 | B1 | 6/2014 | Liang et al. | |
| 2001/0033450 | A1 * | 10/2001 | Bryant et al. | 360/75 |
| 2006/0171059 | A1 | 8/2006 | Chan et al. | |
| 2007/0070538 | A1 | 3/2007 | Lau et al. | |
| 2007/0076314 | A1 | 4/2007 | Rigney | |
| 2007/0211367 | A1 * | 9/2007 | Lau et al. | 360/75 |
| 2007/0291401 | A1 | 12/2007 | Sun et al. | |
| 2008/0144210 | A1 * | 6/2008 | Dougherty et al. | 360/77.02 |
| 2009/0086357 | A1 | 4/2009 | Ehrlich | |
| 2009/0168218 | A1 * | 7/2009 | Mizukoshi et al. | 360/51 |
| 2009/0195936 | A1 * | 8/2009 | Zhao et al. | 360/254.7 |
| 2010/0035085 | A1 | 2/2010 | Jung et al. | |
| 2012/0284493 | A1 | 11/2012 | Lou et al. | |
| 2013/0120870 | A1 | 5/2013 | Zhou et al. | |
| 2013/0148240 | A1 | 6/2013 | Ferris et al. | |

* cited by examiner

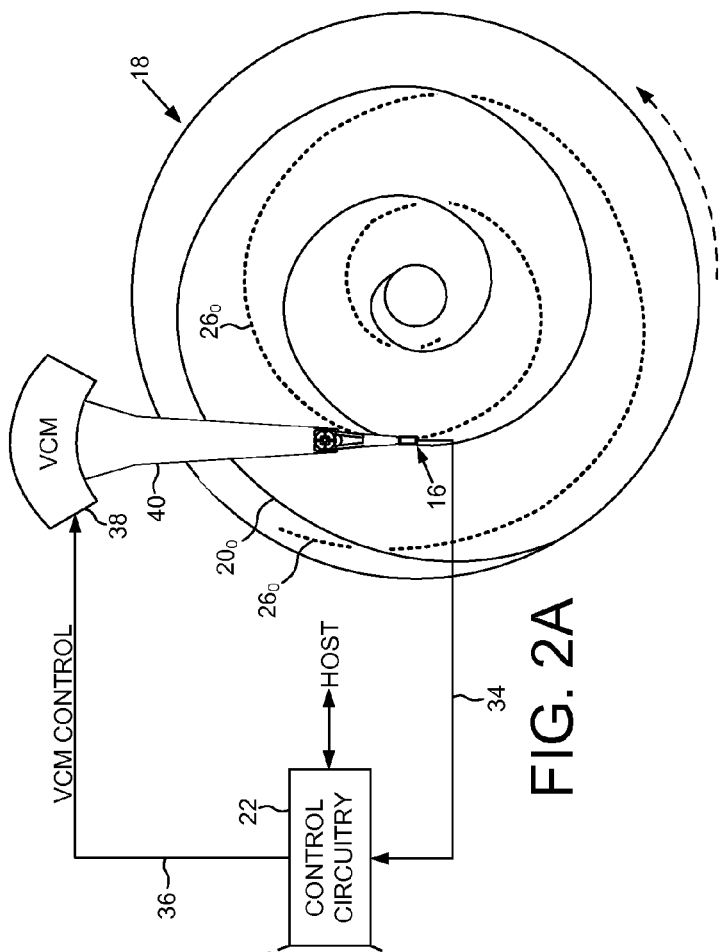
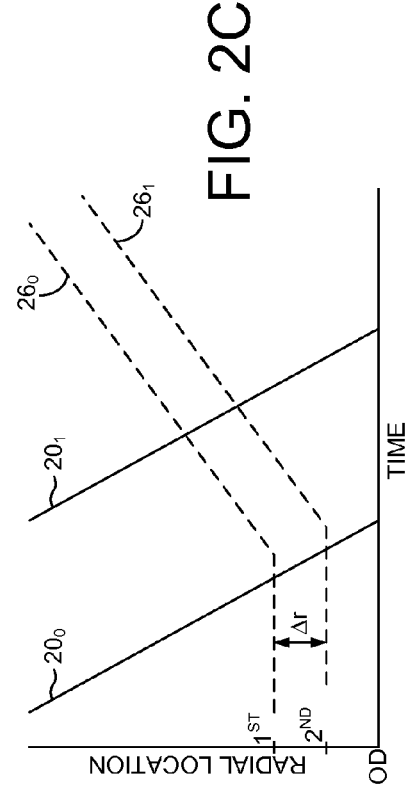
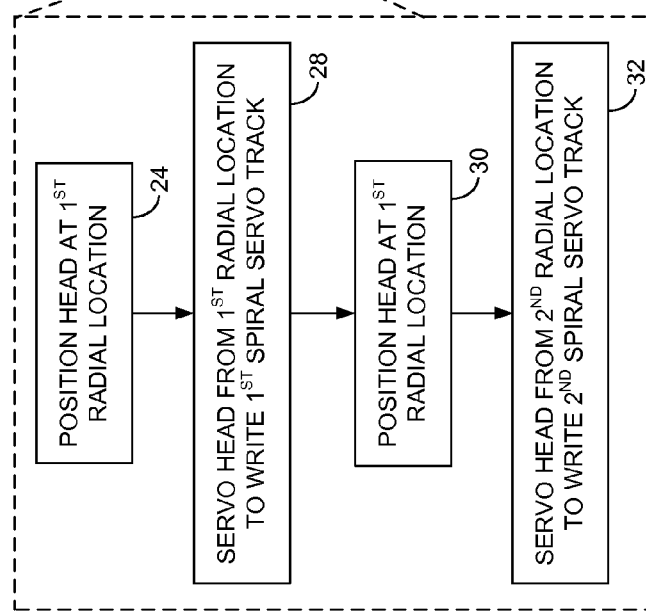
FIG. 2A
FIG. 2B
FIG. 2C $$\Delta r = \frac{v_f T}{N} * \frac{v_s}{v_s + v_f} \quad \text{and} \quad \Delta t = \frac{\Delta r}{v_s}$$

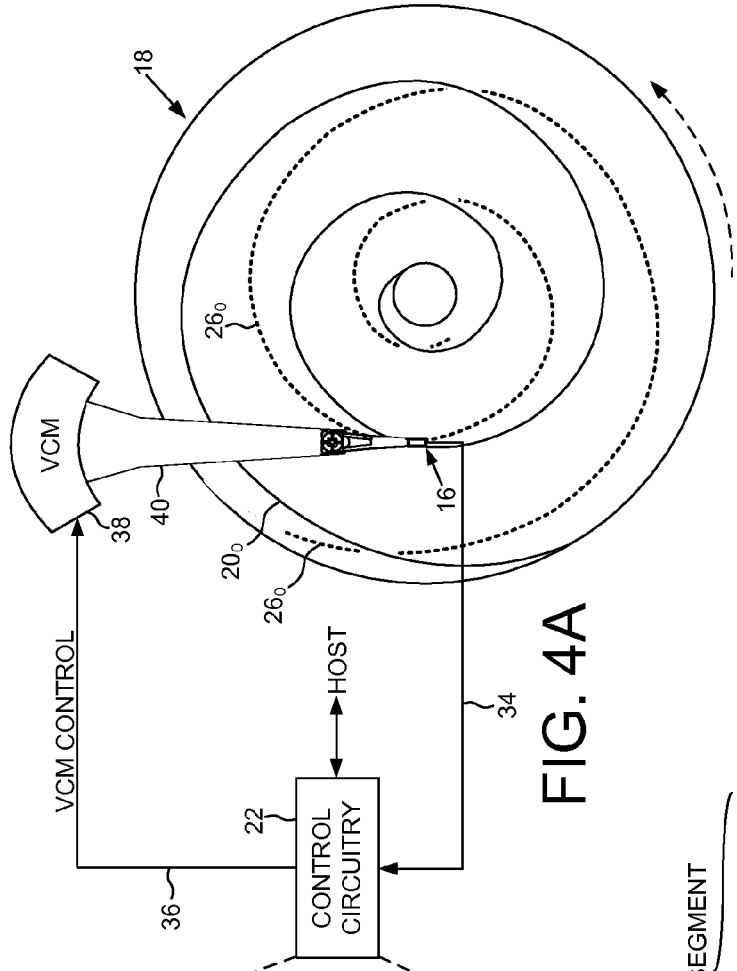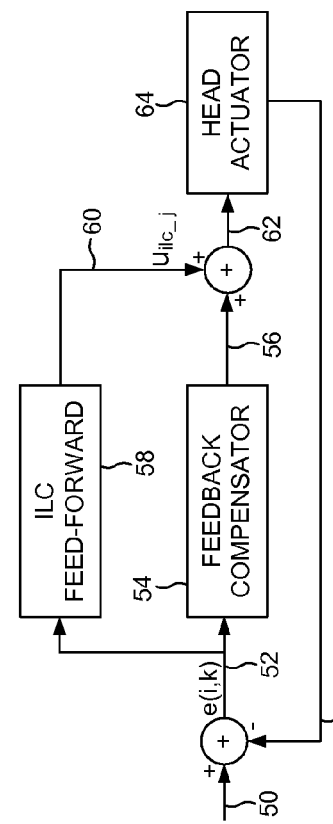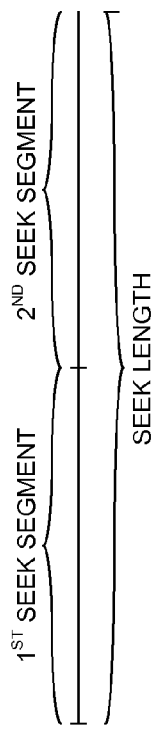

FIG. 5A
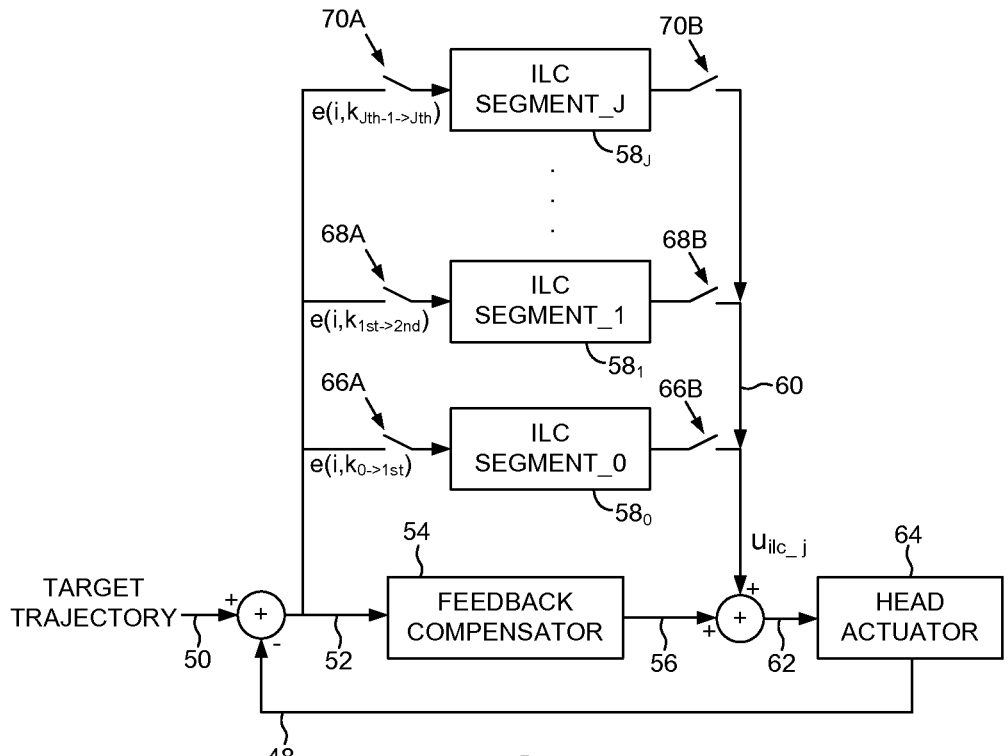
FIG. 5B
$u_{ilc\_j}(i+1,k-2) = u_{ilc\_j}(i,k-2) + K_p e(i,k)$ with $j = 0,...,J$ ; $i = 0,...,I_M$ ; $k = k_j,...,k_{j+1}-1$
FIG. 5C
$u_{ilc\_j}(i+1,k-2) = u_{ilc\_j}(i,k-2) + K_{pj} e(i,k)$ with $j = 0,...,J$ ; $i = 0,...,I_M$ ; $k = k_j,...,k_{j+1}-1$
FIG. 5D
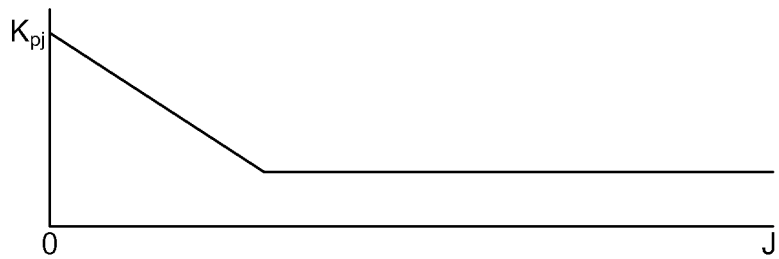
FIG. 5E

US 9,076,490 B1

DISK DRIVE WRITING RADIAL OFFSET SPIRAL SERVO TRACKS BY READING SPIRAL SEED TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (A, B, C, D in the example shown), which are recorded with precise intervals and offsets relative to the servo track centerlines. The servo bursts 14 provide fine head position information used for centerline tracking while accessing a data track during write/read operations.

In the past, external servo writers have been used to write the concentric servo sectors $6_0$-$6_N$ to the disk surface during manufacturing. External servo writers employ extremely accurate head positioning mechanics, such as a laser interferometer, to ensure the concentric servo sectors $6_0$-$6_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, a known self-servo writing technique performs a self-servo writing operation by writing a plurality of spiral servo tracks to the disk which are then processed to write the concentric servo sectors along a circular path. Prior art techniques have also been employed to self-servo write a plurality of spiral seed tracks which are then used to self-servo write the spiral servo tracks. It is desirable to self-servo write the spiral servo tracks in a consistent manner in order to minimize the difference between the trajectories as well as maintain a consistent spacing between the spiral servo tracks.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein a plurality of spiral servo tracks are written at a different starting radial location in order to achieve a consistent trajectory and spacing across the spiral servo tracks.

FIG. 2C illustrates an embodiment wherein first and second spiral servo tracks are written with a radial offset.

FIG. 4A shows a disk drive according to an embodiment of the present invention for servo writing spiral servo tracks.

FIG. 4B shows a servo control system according to an embodiment of the present invention comprising an iterative learning control (ILC) feed-forward controller.

FIG. 4C is a flow diagram according to an embodiment of the present invention wherein the feed-forward compensation values are adapted by the ILC feed-forward controller over segments of a seek length.

FIG. 4D illustrates first and second segments of a seek length, wherein the feed-forward compensation values are adapted by the ILC feed-forward controller for the first segment, and then those feed-forward compensation values are used while adapting the feed-forward compensation values for the second segment according to an embodiment of the present invention.

FIG. 5A shows an embodiment of the present invention wherein the seek length is divided into J segments according to an embodiment of the present invention.

FIG. 5B illustrates the sequential aspect of adapting the feed-forward compensation values for each segment of the seek length according to an embodiment of the present invention.

FIG. 5C shows an equation implemented by the ILC feed-forward controller for adapting the feed-forward compensation values according to an embodiment of the present invention.

FIGS. 5D and 5E illustrate an embodiment of the present invention wherein a gain for the ILC equation is selected for each segment of the seek length, and in the embodiment shown, the gain decreases to a steady state value as the segment number increases.

DETAILED DESCRIPTION

Figure 1:
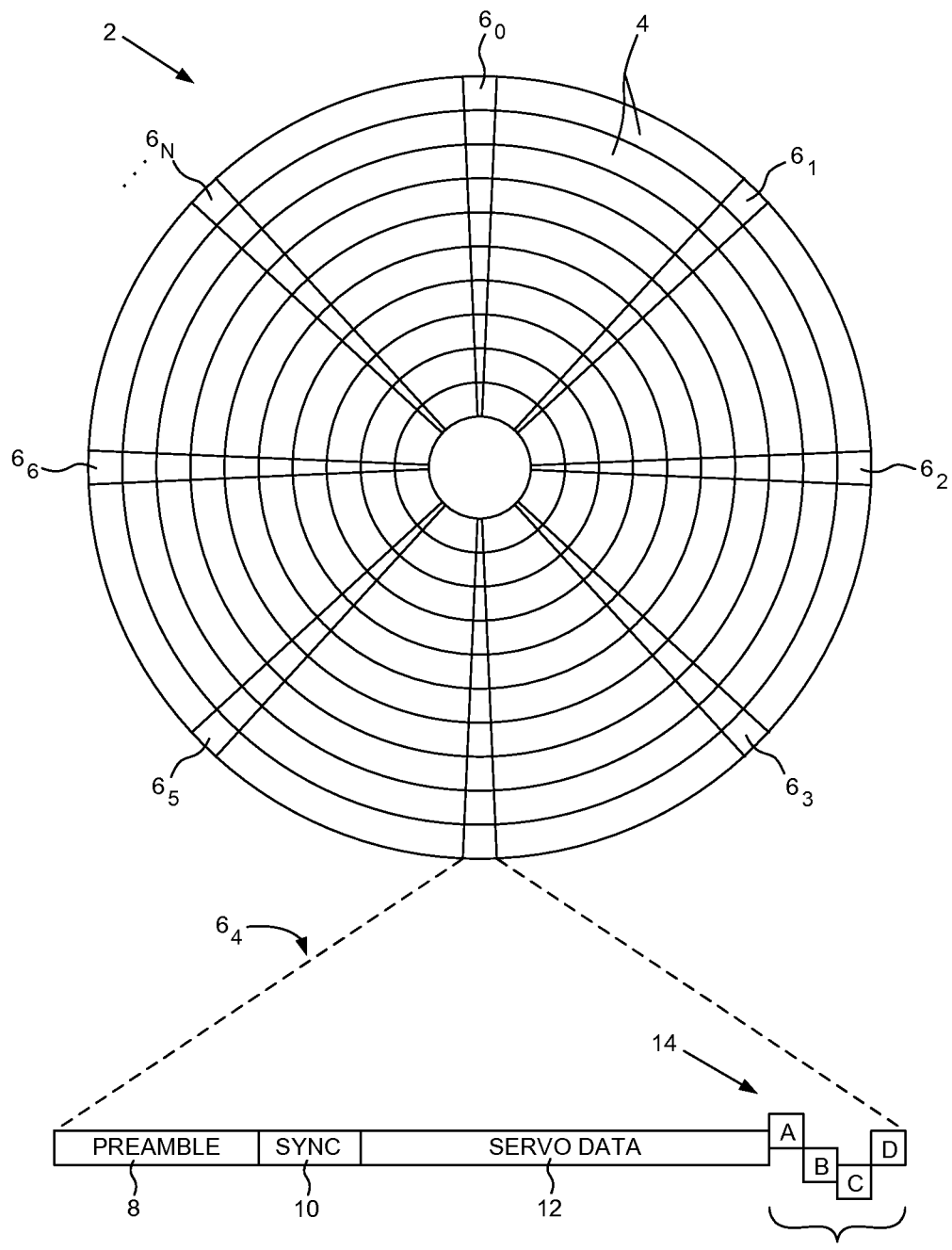
FIG. 1 shows a prior art disk format comprising a plurality of servo tracks defined by concentric servo sectors.

FIG. 2A shows a disk drive according to an embodiment of the present invention comprising a head 16 actuated over a disk 18 comprising a plurality of spiral seed tracks (e.g., spiral seed track $20_0$). The disk drive further comprises control circuitry 22 operable to execute the flow diagram of FIG. 2B, wherein the head is positioned at a first radial location over the disk (block 24), and the head is servoed over the disk in response to the spiral seed tracks starting from the first radial location in order to write a first spiral servo track $26_0$ on the disk (block 28). The head is positioned at a second radial location over the disk different from the first radial location (block 30), and the head is servoed over the disk in response to the spiral seed tracks starting from the second radial location in order to write a second spiral servo track $26_1$ on the disk (block 32). An example of this embodiment is illustrated in FIG. 2C wherein there is a radial offset Δr between the first and second spiral servo tracks $26_0$ and $26_1$ which are written while servoing on spiral seed tracks $20_0$ and $20_1$.

Any suitable spiral seed tracks may be employed in the embodiments of the present invention. In the embodiment shown in FIGS. 2A and 2C, each spiral seed track (e.g., spiral seed track $20_0$) is written to the disk while moving the head radially across the disk from the inner diameter (ID) toward the outer diameter (OD). In the example of FIG. 2A, only one spiral seed track $20_0$ is shown for clarity, but other embodiments there are at least two spiral seed tracks. Each spiral seed track may comprise any suitable pattern, wherein in one embodiment each spiral seed track comprises a high frequency pattern interrupted at a periodic interval by a sync mark. The head may be servoed radially over the disk in response to the spiral seed tracks in any suitable manner, such as by detecting a radial shift in the demodulated high frequency pattern relative to the sync marks.

In the embodiment shown in FIG. 2A, each spiral servo track (e.g., spiral servo track $26_0$) is written while moving the head radially across the disk from the OD to the ID. When the head 16 is about to cross over a spiral seed track, the writing of the spiral servo track is paused in order to read and demodulate the spiral seed track into the servo state information used to maintain the head along a desired trajectory while writing the spiral servo track. In one embodiment, the control circuitry 22 demodulates the read signal 34 emanating from the head while crossing a spiral seed track into a suitable servo state (e.g., position, velocity, etc.). The servo states are processed using a suitable compensator in order to generate a control signal 36 applied to a voice coil motor (VCM) 38 which rotates an actuator arm 40 about a pivot in order to move the head radially over the disk while writing the spiral servo track (e.g., spiral servo track $26_0$).

The spiral seed tracks (e.g., spiral seed track $20_0$) may be written to the disk in any suitable manner. In one embodiment, the spiral seed tracks may be written to a plurality of disks using a media writer, or the spiral seed tracks may be stamped or etched onto each disk using any suitable technique, prior to inserting each disk into a disk drive. In another embodiment, the spiral seed tracks may be written by an external servo writer after inserting each disk into a disk drive. In yet another embodiment, the spiral seed tracks may be self-servo written by the control circuitry 22 within each disk drive after inserting each disk into the disk drive. For example, a seek profile may be calibrated relative to an ID and OD crash stop (or ramp), and the calibrated seek profile used to write each spiral seed track to the disk.

Regardless as to how the spiral seed tracks are written to the disk, the spiral seed tracks are processed in order to servo the head over the disk while writing the spiral servo tracks. In one embodiment, the spiral servo tracks may be used to define the data tracks during normal operation of the disk drive (i.e., instead of writing concentric servo sectors as shown in FIG. 1). In another embodiment, the spiral servo tracks may be processed in order to servo the head over the disk while writing concentric servo sectors on the disk in order to define a final set of concentric servo tracks similar to FIG. 1. Regardless as to whether the spiral servo tracks define the final servo tracks, or whether the spiral servo tracks are used to write concentric servo sectors, it is desirable to write the spiral servo tracks in a consistent manner in order to minimize the difference between the trajectories as well as maintain a consistent spacing between the spiral servo tracks.

Figures 3A, 3B:
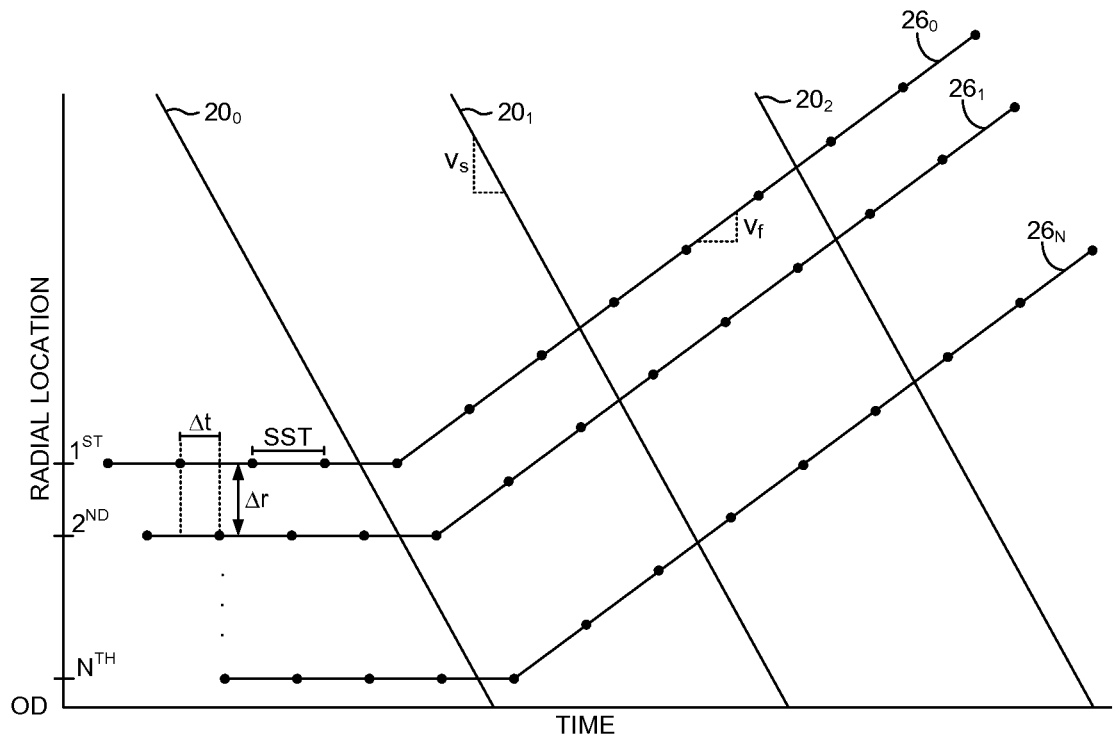
FIG. 3A illustrates an embodiment wherein first and second spiral servo tracks are written with a radial offset and with a shift in the servo sample time in order to achieve a substantially consistent servo sampling relative to spiral seed tracks.
FIG. 3B shows equations for computing the radial offset between spiral servo tracks and the shift in the servo sample time between spiral servo tracks according to an embodiment of the present invention.

FIG. 3A shows an embodiment of the present invention which improves the consistency of the spiral servo tracks by writing each spiral servo track with a predetermined radial offset as well as by shifting a servo sample time (i.e., shift a phase of the servo sample rate). The servo sample rate defines the rate at which at least one servo state is updated while servoing the head in response to the spiral seed tracks. In the example shown in FIG. 3A, the servo samples are represented as black dots along the trajectory of the spiral servo tracks, wherein the time between consecutive dots represents the servo sample period (servo sample time or SST). In one embodiment, writing each spiral servo track with a radial offset $\Delta r$ and shifting the servo sample time by a time offset $\Delta t$, aligns the servo samples relative to the spiral seed tracks as shown in FIG. 3A. For example, in FIG. 3A the head crosses the first spiral seed track $20_0$ between the fourth and fifth servo samples when writing all of the spiral servo tracks due to the radial offset $\Delta r$ and the time offset $\Delta t$. Accordingly, the difference between the radial locations (radial offset $\Delta r$) and the shift of the servo sample time (time offset $\Delta t$) results in a substantially consistent servo sampling relative to the spiral seed tracks.

FIG. 3B shows equations according to an embodiment of the present invention for computing the radial offset $\Delta r$ and the time offset $\Delta t$ that is introduced between the writing of each spiral servo track. In the equations shown in FIG. 3B, $\Delta r$ represents the difference between the first and second radial locations (the radial offset), $v_f$ represents a velocity of the head while writing the spiral servo tracks, T represents a number of servo samples in a revolution of the disk, N represents a number of spiral servo tracks written to the disk, and $v_s$ represents a velocity of a trajectory of the spiral seed tracks. The variables $v_s$ and $v_f$ are represented graphically in FIG. 3B as the slope of the spiral seed tracks and the slope of the spiral servo tracks, respectively.

In one embodiment, writing the spiral servo tracks with a radial offset $\Delta r$ and a shift of the servo sample time (time offset $\Delta t$) in order to achieve a substantially consistent servo sampling relative to the spiral seed tracks improves the performance of the servo control system, thereby resulting in more consistent spiral servo tracks (trajectory and spacing). FIG. 4A shows a disk drive according to an embodiment of the present invention wherein the control circuitry 22 comprises a servo control system (FIG. 4B) operable to actuate the head 16 over the disk 18 in response to servo information recorded on the disk 18. In the embodiment of FIG. 4A, the servo information comprises spiral seed tracks (e.g., spiral seed track $20_0$) and the head 16 is servoed over the disk 18 while writing spiral servo tracks (e.g., spiral servo track $26_0$). The servo control system is operable to execute the flow diagram shown in FIG. 4C, wherein a position error signal is generated while executing a first plurality of seek operations to seek the head over a seek length, and first feed-forward compensation values are adapted for a first segment of the seek length using an iterative learning control algorithm based on the position error signal generated over the first segment during the first plurality of seek operations (block 42). The position error signal is then generated while executing a second plurality of seek operations to seek the head over the seek length, and second feed-forward compensation values are adapted for a second segment of the seek length using the iterative learning control algorithm based on the position error signal generated over the second segment during the second plurality of seek operations (block 44), wherein the servo control system is operable to execute the second plurality of seek operations using the first feed-forward compensation generated for the first segment of the seek length.

In the embodiment of FIG. 4A, the seek length corresponds to seeking the head 16 from the OD to the ID of the disk 18 while writing a spiral servo track (e.g., spiral servo track $26_0$). FIG. 4D shows an embodiment wherein the seek length is divided into two segments; however, the seek length may be divided into any suitable number of segments (e.g., J segments as shown in FIG. 5A). In one embodiment, the servo control system (FIG. 4B) adapts the feed-forward compensation values for the first segment at the beginning of the seek length, and then adapts the feed-forward compensation values for the next segment while applying the feed-forward compensation for the first segment, and so on until the feed-forward compensation values have been adapted for all of the segments.

The servo control system shown in the embodiment of FIG. 4B compares a measured position of the head 48 to a target trajectory 50 in order to generate a position error signal e(i,k) 52, where i represents the current seek iteration and k represents the current servo sample along the seek length. The position error signal 52 is processed by any suitable feedback compensator 54 (e.g., a proportional-integral-derivative compensator) to generate a feedback control signal 56. The position error signal 52 is also processed by an iterative learning control (ILC) feed-forward compensator 58 to generate the feed-forward compensation values $u_{ilc\_j}$ 60, where j represents the current seek length segment. The feed-forward compensation values 60 are used to adjust the feedback control signal 56 to generate a control signal 62 applied to a suitable head actuator 64 (such as the VCM 38 shown in FIG. 4A).

FIGS. 5A-5C illustrate an embodiment of the present invention wherein the seek length is divided into J segments. When adapting the feed-forward compensation values 60 for the first segment (SEGMENT_0), switches 66A and 66B are closed and switches 68A, 68B, 70A and 70B are opened. The servo control system then performs a first seek (i=0) and adapts the feed-forward compensation values 60 for the first segment using ILC SEGMENT_0 $58_0$ (i.e., execute the equation of FIG. 5C using the position error signal e for k=0 to k=end of $1^{st}$ segment). The servo control system performs multiple seeks (i=0 to i=M) while continuing to adapt the feed-forward compensation values 60 for the first segment. In an alternative embodiment, the number of seeks may terminate based on any suitable metric, such as the derivative of the feed-forward compensation values 60 falling below a threshold, or the average position error signal falling below a threshold (i.e., until the feed-forward compensation values converge).

After adapting the feed-forward compensation values 60 for the first segment, switch 66A is opened and switches 68A and 68B are closed. The servo control system then performs a first seek (i=0) and adapts the feed-forward compensation values 60 for the second segment using ILC SEGMENT_1 $58_1$ (i.e., execute the equation of FIG. 5C using the position error signal e for k=start of $2^{nd}$ segment to k=end of $2^{nd}$ segment). During the first part of the seek (k=0 to end of $1^{st}$ segment), switch 66B is closed and the feed-forward compensation values 60 for the first segment are used to adjust the feedback control signal 56. The servo control system performs multiple seeks (i=0 to i=M) while continuing to adapt the feed-forward compensation values 60 for the second segment.

The above process is repeated for each segment of the seek length until the feed-forward compensation values 60 have been adapted for the last segment (SEGMENT_J). In one embodiment, the feed-forward compensation values 60 for a previously adapted segment may be further adapted while adapting the feed-forward compensation values 60 for the following segments. For example, when adapting the feed-forward compensation values 60 for the second segment (SEGMENT_1), switch 66A may remain closed during the first part of the seek (k=0 to end of $1^{st}$ segment) in order to further adapt the feed-forward compensation values 60 for the first segment (SEGMENT_0).

In one embodiment, after the feed-forward compensation values 60 have been adapted for all of the segments, the switches 66A, 68A and 70A are opened and switches 66B, 68B and 70B are closed in sequence during subsequent seeks (e.g., while servo writing spiral servo tracks). That is, in this embodiment the feed-forward compensation values 60 are not adapted during normal seek operations. In an alternative embodiment, the feed-forward compensation values 60 may be further adapted during normal seek operations by closing switches 66A, 68A and 70A in sequence. In yet another embodiment, adapting of the feed-forward compensation values 60 may be enabled periodically in order to compensate for changes in environmental conditions, such as changes in temperature.

In one embodiment, the adapted feed-forward compensation values 60 may be stored as raw values in a lookup table and indexed by the servo sample index k during seek operations. In an alternative embodiment, the raw values of the adapted feed-forward compensation values may be generated during a seek operation using any suitable function, such as a suitable polynomial. In the embodiment wherein the feed-forward compensation values are adapted during normal operation, the raw values may be used to update the function (e.g., coefficients of a polynomial) used to generate the updated feed-forward compensation values.

In the embodiment of FIG. 5C, the ILC equation for adapting the feed-forward compensation values comprises a gain Kp that controls the learning speed of the ILC algorithm. In one embodiment, the gain Kp is constant while adapting the feed-forward compensation values for each segment of the seek length. In another embodiment illustrated in FIG. 5D, the gain Kpj may be different between at least two of the segments (indexed by j). FIG. 5E illustrates an embodiment wherein the gain Kpj of the learning coefficient is maximum for the first segment (j=0), and then ramps down to a steady state value for the subsequent segments. That is, the ILC algorithm is configured to adapt faster during the initial segments of the seek length, and then ramp down toward the constant value.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of spiral seed tracks;
    a head; and
    control circuitry operable to:
        position the head at a first radial location over the disk;
        servo the head over the disk in response to the spiral seed tracks starting from the first radial location in order to write a first spiral servo track on the disk;
        position the head at a second radial location over the disk different from the first radial location;
        servo the head over the disk in response to the spiral seed tracks starting from the second radial location in order to write a second spiral servo track on the disk; and
        configure a difference between the first and second radial locations according to:

$$\Delta r = \frac{v_f T}{N} * \frac{v_s}{v_s + v_f}$$

where:
        $\Delta r$ represents the difference between the first and second radial locations;
        $v_f$ represents a velocity of the head while writing the first and second spiral servo tracks;
        T represents a number of servo samples in a revolution of the disk;
        N represents a number of spiral servo tracks written to the disk; and
        $v_s$ represents a velocity of a trajectory of the spiral seed tracks.

2. The disk drive as recited in claim 1, wherein a radial trajectory of the spiral seed tracks is opposite a radial trajectory of the spiral servo tracks.

3. The disk drive as recited in claim 1, wherein:
    when writing the first spiral servo track to the disk the control circuitry is operable to servo the head over the disk by updating at least one servo state at a servo sample rate; and
    prior to writing the second spiral servo track to the disk the control circuitry is operable to shift a phase of the servo sample rate.

4. The disk drive as recited in claim 3, wherein the difference between the first and second radial locations and the shift of the phase of the servo sample rate results in a substantially consistent servo sampling relative to the spiral seed tracks.

5. The disk drive as recited in claim 3, wherein
    the shift of the phase of the servo sample rate is configured according to:

$$\frac{\Delta r}{v_s}$$

6. A method of operating a disk drive comprising a head actuated over a disk comprising a plurality of spiral seed tracks, the method comprising:
    positioning the head at a first radial location over the disk;
    servoing the head over the disk in response to the spiral seed tracks starting from the first radial location in order to write a first spiral servo track on the disk;
    positioning the head at a second radial location over the disk different from the first radial location;
    servoing the head over the disk in response to the spiral seed tracks starting from the second radial location in order to write a second spiral servo track on the disk; and
    configuring a difference between the first and second radial locations according to:

$$\Delta r = \frac{v_f T}{N} * \frac{v_s}{v_s + v_f}$$

where:
        $\Delta r$ represents the difference between the first and second radial locations;
        $v_f$ represents a velocity of the head while writing the first and second spiral servo tracks;
        T represents a number of servo samples in a revolution of the disk;
        N represents a number of spiral servo tracks written to the disk; and
        $v_s$ represents a velocity of a trajectory of the spiral seed tracks.

7. The method as recited in claim 6, wherein a radial trajectory of the spiral seed tracks is opposite a radial trajectory of the spiral servo tracks.

8. The method as recited in claim 6, wherein:
    when writing the first spiral servo track to the disk further comprising servoing the head over the disk by updating at least one servo state at a servo sample rate; and
    prior to writing the second spiral servo track to the disk further comprising shifting a phase of the servo sample rate.

9. The method as recited in claim 8, wherein the difference between the first and second radial locations and the shift of the phase of the servo sample rate results in a substantially consistent servo sampling relative to the spiral seed tracks.

10. The method as recited in claim 8, wherein
    the shift of the phase of the servo sample rate is configured according to:

$$\frac{\Delta r}{v_s}$$

11. A disk drive comprising:
    a disk comprising a plurality of spiral seed tracks;
    a head; and
    control circuitry operable to:
        position the head at a first radial location over the disk;
        servo the head over the disk in response to the spiral seed tracks starting from the first radial location in order to write a first spiral servo track on the disk;
        position the head at a second radial location over the disk different from the first radial location; and
        servo the head over the disk in response to the spiral seed tracks starting from the second radial location in order to write a second spiral servo track on the disk,
        wherein a radial trajectory of the spiral seed tracks is opposite a radial trajectory of the spiral servo tracks.

12. A method of operating a disk drive comprising a head actuated over a disk comprising a plurality of spiral seed tracks, the method comprising:
    positioning the head at a first radial location over the disk;
    servoing the head over the disk in response to the spiral seed tracks starting from the first radial location in order to write a first spiral servo track on the disk;

positioning the head at a second radial location over the disk different from the first radial location; and servoing the head over the disk in response to the spiral seed tracks starting from the second radial location in order to write a second spiral servo track on the disk, wherein a radial trajectory of the spiral seed tracks is opposite a radial trajectory of the spiral servo tracks.

13. A disk drive comprising:

a disk comprising a plurality of spiral seed tracks;

a head; and control circuitry operable to:

position the head at a first radial location over the disk;

servo the head over the disk in response to the spiral seed tracks starting from the first radial location in order to write a first spiral servo track on the disk;

position the head at a second radial location over the disk different from the first radial location; and servo the head over the disk in response to the spiral seed tracks starting from the second radial location in order to write a second spiral servo track on the disk, wherein:

when writing the first spiral servo track to the disk the control circuitry is operable to servo the head over the disk by updating at least one servo state at a servo sample rate; and prior to writing the second spiral servo track to the disk the control circuitry is operable to shift a phase of the servo sample rate according to:

$$\frac{\Delta r}{v_s}$$

where:

$\Delta r$ represents a difference between the first and second radial locations; and $v_s$ represents a velocity of a trajectory of the spiral seed tracks.

14. A method of operating a disk drive comprising a head actuated over a disk comprising a plurality of spiral seed tracks, the method comprising:

positioning the head at a first radial location over the disk;

servoing the head over the disk in response to the spiral seed tracks starting from the first radial location in order to write a first spiral servo track on the disk;

positioning the head at a second radial location over the disk different from the first radial location; and servoing the head over the disk in response to the spiral seed tracks starting from the second radial location in order to write a second spiral servo track on the disk, wherein:

when writing the first spiral servo track to the disk the method further comprises servoing the head over the disk by updating at least one servo state at a servo sample rate; and prior to writing the second spiral servo track to the disk the method further comprises shifting a phase of the servo sample rate according to:

$$\frac{\Delta r}{v_s}$$

where:

$\Delta r$ represents a difference between the first and second radial locations; and $v_s$ represents a velocity of a trajectory of the spiral seed tracks.

\* \* \* \* \*